United States Patent
Owens et al.

(10) Patent No.: US 9,580,318 B2
(45) Date of Patent: *Feb. 28, 2017

(54) OZONE GENERATOR

(71) Applicant: MKS Instruments, Inc., Andover, MA (US)

(72) Inventors: David Kingston Owens, Bedford, NH (US); Paul Michael Meneghini, Ipswich, MA (US)

(73) Assignee: MKS Instruments, Inc., Andover, MA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/705,439

(22) Filed: May 6, 2015

(65) Prior Publication Data

US 2015/0232335 A1   Aug. 20, 2015

Related U.S. Application Data

(63) Continuation of application No. 13/153,649, filed on Jun. 6, 2011, now Pat. No. 9,039,985.

(51) Int. Cl.
    *C01B 13/11* (2006.01)

(52) U.S. Cl.
    CPC ............ *C01B 13/11* (2013.01); *C01B 2201/12* (2013.01); *C01B 2201/22* (2013.01); *C01B 2201/32* (2013.01); *Y10T 29/49155* (2015.01)

(58) Field of Classification Search
    CPC .. C01B 13/11; C01B 2201/32; C01B 2201/12; C01B 2201/22; C01B 2201/24; C01B 2201/34; C01B 2201/64; C01B 2201/74; C01B 2201/70; Y10T 29/49155; Y10T 29/49124; B01J 19/088; B01J 19/087; B01J 2219/0809; B01J 2219/0871; B01J 2201/782; C02F 2201/782
    See application file for complete search history.

(56) References Cited

U.S. PATENT DOCUMENTS

| 950,347 | A | 2/1910 | Rice |
|---|---|---|---|
| 1,436,251 | A | 11/1922 | Hartman |
| 1,768,891 | A | 6/1929 | Davis et al. |
| 2,429,152 | A | 6/1942 | Allison |
| 2,808,374 | A | 1/1954 | Mueller et al. |
| 4,666,679 | A | 5/1987 | Masuda et al. |
| 4,690,803 | A | 9/1987 | Hirth |
| 4,986,968 | A | 1/1991 | Hirth et al. |

(Continued)

FOREIGN PATENT DOCUMENTS

| CN | 1421379 | 6/2003 |
|---|---|---|
| CN | 1774394 | 5/2006 |

(Continued)

OTHER PUBLICATIONS

Hiroshi, Orishima, et al.; Machine Translation of JP2004224695(A); "Discharge Cell for Ozone Generator"; 12 pages, 2004.

(Continued)

*Primary Examiner* — Xiuyu Tai
(74) *Attorney, Agent, or Firm* — Burns & Levinson, LLP; Joseph M. Maraia; Steven M. Mills (57) ABSTRACT

Ozone generator cells that include two thermally conductive plates that maintain contact between various layers of the cells in the absence of a bonding agent. The cells lack aluminum-containing materials in the discharge region of the cell.

10 Claims, 5 Drawing Sheets

(56) References Cited

U.S. PATENT DOCUMENTS

| | | |
|---|---|---|
| 5,211,919 A | 5/1993 | Conrad |
| 5,435,978 A | 7/1995 | Yokomi |
| 5,552,125 A | 9/1996 | Chamblee et al. |
| 5,637,279 A | 6/1997 | Besen et al. |
| 5,759,497 A | 6/1998 | Kuzumoto et al. |
| 5,932,180 A | 8/1999 | Zhang et al. |
| 5,948,374 A | 9/1999 | Kuzumoto et al. |
| 6,046,533 A | 4/2000 | Nakatsuka |
| 6,093,289 A | 7/2000 | Kuzumoto et al. |
| 7,108,836 B2 | 9/2006 | Okihara et al. |
| 7,382,087 B2 | 6/2008 | Tabata et al. |
| 7,402,289 B2 | 7/2008 | Tabata |
| 7,695,691 B2 | 4/2010 | Orishima et al. |
| 2003/0095900 A1 | 5/2003 | Tabata et al. |
| 2005/0226791 A1 | 10/2005 | Wada et al. |
| 2006/0045826 A1 | 3/2006 | Mullaney |
| 2006/0049738 A1 | 3/2006 | Tabata et al. |
| 2013/0224084 A1 | 8/2013 | Lim et al. |

FOREIGN PATENT DOCUMENTS

| | | |
|---|---|---|
| EP | 1291320 | 3/2003 |
| EP | 1314693 | 5/2003 |
| JP | H01146552 | 10/1989 |
| JP | 543204 | 2/1993 |
| JP | 11307227 | 11/1999 |
| JP | 2003160309 | 6/2003 |
| JP | 2004224695 | 8/2004 |
| JP | 2004359537 | 12/2004 |
| JP | 2006298758 | 11/2006 |
| JP | 2007119305 | 5/2007 |
| JP | 2007197318 | 8/2007 |

OTHER PUBLICATIONS

AX84 Cellframe Stacking Assembly Document; MKS Instruments, Inc.; pp. 3-7; Aug. 11, 1997 (5 pages).
AX8400 Series Ozone Generators Brochure; MKS Instruments, Inc.; 2006 (2 pages).
Ozone Generator AX8200 Series; Installation and Operations Manual; Part No. OM82001 Rev. C; MKS Instruments, Inc.; 2001.
Courbon, et al.; "Study of Oxygen Isotopic Exchange over Ultraviolet Irradiated Anatase Samples and Comparison with the Photooxidation of Isobutane into Acetone"; The Journal of Physical Chemistry; vol. 81; No. 6; pp. 550-554; 1977.
Guaitella, et al.; "Plasma-photocatalyst interaction: Production of oxygen atoms in a low pressure discharge"; Applied Physics Letters; vol. 86; No. 15/502; pp. 1-3; 2005.
Hakim, et al.; "Nanoparticle Coating for Advanced Optical, Mechanical and Rheological Properties"; Advanced Functional Materials; vol. 17; pp. 2175-3181; 2007.
Huang, et al.; "Core-Shell Microspherical Ti1-xZrxO2 Solid Solution Photocatalysts Directly from Ultrasonic Spray Pyrolysis"; The Journal of Physical Chemistry B; vol. 110; Issue 39; pp. 19323-19328; 2006.
Liou, et al.; "Ozone Formation Studied by Observing Emission Yielding from an Oxygen-fed Micro-Discharge"; Ozone: Science & Engineering; vol. 21; Issue 3; pp. 229-238; 1999.
Mehandjiev, et al.; "Ozone Decomposition on α-Fe2O3 Catalyst"; Ozone Science & Engineering; vol. 14; pp. 277-282; 1992.
Roland, et al; "Combination of non-thermal plasma and heterogeneous catalysis for oxidation of volatile organic aompounds Part 2. Ozone decomposition and deactivation of y-Al2O3"; Applied Catalysis B: Environmental; vol. 58; pp. 217-226; 2005.
Sullivan, et al.; "Ozone decomposition kinetics on alumina: effects of ozone partial pressure, relative humidity and state of film oxidation"; Atmospheric Chemistry and Physics Discussions; vol. 4; pp. 1977-2002; 2004.
Thomas, et al.; "Experimental and theoretical study of ozone absorption on alumina"; Catalysis Letters; vol. 46; pp. 77-82; 1997.
Tseng, et al.; "Photocatalytic Oxidation Process for the Treatment of Organic Wastes"; Chemical Oxidation Technologies for the Nineties; pp. 262-277; Technomic Publishing Co.; 1992.
Vesel, et al.; "Oxidation of AISI 304L stainless steel surface with atomic oxygen"; Applied Surface Science; vol. 200; pp. 94-103; 2002.
Wang, et al.; "Heat transfer and friction characteristics of plain fin-and-tube heat exchangers, part II: Correlation"; International Journal of Heat and Mass Transfer; vol. 43; pp. 2693-2700; 2000.
Miyauchi, et al.; "Hydrophilic Layered SiO2/TiO2/WO3 Thin Film for Indoor Anti-Fogging Coatings"; Journal of the Ceramic Society of Japan; Supplement 112-1; PacRim5 Special Issue; pp. S1414-S1418; 2004.
Kraus, et al.; "Extended Surface Heat Transfer"; Wiley-Interscience; Sections 1.2, 1.4 and 4.4; 2001.
Winands; "Efficient Streamer Plasma Generation"; Eindhoven University of Technology; Department of Electrical Engineering; 2007.
AX8100 Ozone Generator; Operational Manual; Version Preliminary; Applied Science and Technology, Inc.; P/N OM81000; 1995.
Drimal; "The Dependence of Ozone Generation Efficiency in Silent Discharge on a Width of a Discharge Gap"; Czech. J. Phys. B.; vol. 38; pp. 643-648; 1988.

OZONE GENERATOR

RELATED APPLICATION

This application is a continuation of U.S. patent application Ser. No. 13/153,649, filed in the U.S. Patent and Trademark Office on Jun. 6, 2011, the entire contents of which are incorporated herein by reference.

FIELD OF THE INVENTION

The currently described invention relates to ozone generators and methods for generating ozone.

BACKGROUND

Prior art ozone generators are incapable of producing useful quantities of ozone without a dopant (e.g., nitrogen) for extended periods of time. In addition, the ozone generators also are unable to operate at very low temperatures which are necessary to produce high concentrations of ozone.

A need therefore exists for improved ozone generators and methods for generating ozone.

SUMMARY

Embodiments of the invention involve ozone generators and methods for producing high concentrations of high purity ozone with systems that have reduced shear stress between the components of the ozone generator cells. These systems are able to operate at very low temperatures and have improved serviceability relative to conventional systems.

The invention, in one aspect, features an ozone generator cell that includes a high voltage electrode layer and two dielectric layers. The first dielectric layer is disposed on a first side of the high voltage electrode layer and the second dielectric layer is disposed on the second, opposite side of the high voltage electrode layer. The ozone generator cell also includes two low voltage electrode layers. One low voltage electrode layer is disposed over each of the two dielectric layers. The ozone generator cell also includes two discharge regions, the first discharge region defined, in part, by the high voltage electrode layer, the dielectric layer disposed on the first side of the high voltage electrode layer, and the low voltage electrode layer disposed on the first side of the high voltage electrode layer, the second discharge region defined, in part, by the high voltage electrode layer, the dielectric layer is disposed on the second side of the high voltage electrode layer, and the low voltage electrode layer is disposed on the second side of the high voltage electrode layer. The ozone generator cell also includes two thermally conductive plates, the first thermally conductive plate in contact with the low voltage electrode layer on the first side of the high voltage electrode layer, and the second thermally conductive plate in contact with the low voltage electrode layer on the second side of the high voltage electrode layer, wherein the two thermally conductive plates maintain contact between the layers located therebetween in the absence of a bonding agent.

In some embodiments, maintaining contact between the layers located between the first and second thermally conductive plates in the absence of a bonding agent produces a reduced thickness of a combination of the dielectric layers and the high voltage electrode layer. In some embodiments, the reduced thickness produces an increased capacitance between the low voltage electrode layers and the high voltage electrode layer. In some embodiments, the dielectric layers, the low voltage electrode layers, and the high voltage electrode layer are fabricated using non-aluminum containing materials.

In some embodiments, the ozone generator cell includes spacer shims protruding from a surface of each low voltage electrode layer towards a surface of a dielectric layer. In some embodiments, the first dielectric layer is sandwiched between the spacer shims protruding from the surface of one of the low voltage electrode layers and the first side of the high voltage electrode layer, and the second dielectric layer is sandwiched between the spacer shims protruding from the surface of the other of the low voltage electrode layers and the second side of the high voltage electrode layer. In some embodiments, the spacer shims are integral portions of the low voltage electrode layers or separate components sandwiched between the dielectric layers and the low voltage electrode layers.

The invention, in another aspect, features a method for fabricating an ozone generator cell. The method includes locating a first dielectric layer on a first side of a high voltage electrode layer and locating a second dielectric layer on a second, opposite side of the high voltage electrode layer. The method also includes locating a first low voltage electrode layer over the first dielectric layer to define a first discharge region by combination of the high voltage electrode layer, the first dielectric layer and the first low voltage electrode layer. The method also includes locating a second low voltage electrode layer over the second dielectric layer to define a second discharge region by combination of the high voltage electrode layer, the second dielectric layer and the second low voltage electrode layer. The method also includes locating a first thermally conductive plate over the first low voltage electrode layer and locating a second thermally conductive plate over the second low voltage electrode layer. The method also includes applying pressure to all the layers located between the first and second thermally conductive plates to maintain contact between the layers located therebetween in the absence of a bonding agent.

In some embodiments, maintaining contact between the layers located between the first and second thermally conductive plates in the absence of a bonding agent produces an increased electrical capacitance between the low voltage electrode layers and the high voltage electrode layer.

In some embodiments, maintaining contact between the layers located between the first and second thermally conductive plates in the absence of a bonding agent reduces thermal variation effects in the ozone generation cell. In some embodiments, the ozone generation cell may be operated over a wider range of temperatures because of the absence of a bonding agent.

In some embodiments, maintaining contact between the layers located between the first and second thermally conductive plates in the absence of a bonding agent produces a reduced thickness of a combination of the dielectric layers and the high voltage electrode layer. In some embodiments, the method includes fabricating the dielectric layers, the low voltage electrode layers, and the high voltage electrode layer using non-aluminum containing materials. In some embodiments, the method includes using an assembly jig to locate the first dielectric layer, the high voltage electrode layer, the second dielectric layer, the first low voltage electrode layer, the second low voltage electrode layer, the first thermally conductive plate, and the second thermally conductive plate relative to each other.

In some embodiments, spacer shims protrude from a surface of each low voltage electrode layer towards a surface of a dielectric layer. In some embodiments, the first dielectric layer is sandwiched between the spacer shims protruding from the surface of one of the low voltage electrode layers and the first side of the high voltage electrode layer, and the second dielectric layer is sandwiched between the spacer shims protruding from the surface of the other of the low voltage electrode layers and the second side of the high voltage electrode layer.

The invention, in another aspect, features an ozone generator cell that includes a high voltage electrode layer and two dielectric layers. The first dielectric layer is disposed on a first side of the high voltage electrode layer and the second dielectric layer is disposed on the second, opposite side of the high voltage electrode layer. The ozone generator cell also includes two low voltage electrode layers comprising tungsten, wherein one low voltage electrode layer is disposed over each of the two dielectric layers. The ozone generator cell also includes two discharge regions. The first discharge region is defined, in part, by the high voltage electrode layer, the dielectric layer disposed on the first side of the high voltage electrode layer, and the low voltage electrode layer disposed on the first side of the high voltage electrode layer. The second discharge region is defined, in part, by the high voltage electrode layer, the dielectric layer disposed on the second side of the high voltage electrode layer, and the low voltage electrode layer disposed on the second side of the high voltage electrode layer. The ozone generator cell also includes two thermally conductive plates, the first thermally conductive plate in contact with the low voltage electrode layer on the first side of the high voltage electrode layer, and the second thermally conductive plate in contact with the low voltage electrode layer on the second side of the high voltage electrode layer, wherein the two thermally conductive plates maintain contact between the layers located therebetween in the absence of a bonding agent.

In some embodiments, maintaining contact between the layers located between the first and second thermally conductive plates in the absence of a bonding agent produces a reduced thickness of a combination of the dielectric layers and the high voltage electrode layer. In some embodiments, the ozone generator cell includes spacer shims protruding from a surface of each low voltage electrode layer towards a surface of a dielectric layer. In some embodiments, the first dielectric layer is sandwiched between the spacer shims protruding from the surface of one of the low voltage electrode layers and the first side of the high voltage electrode layer, and the second dielectric layer is sandwiched between the spacer shims protruding from the surface of the other of the low voltage electrode layers and the second side of the high voltage electrode layer. In some embodiments, the spacer shims are integral portions of the low voltage electrode layers or separate components sandwiched between the dielectric layers and the low voltage electrode layers.

The invention, in another aspect, features a high concentration ozone generator cell that includes a high voltage electrode layer fabricated using non-aluminum containing materials. The cell also includes two dielectric layers, the first dielectric layer disposed on a first side of the high voltage electrode layer and the second dielectric layer disposed on the second, opposite side of the high voltage electrode layer. The cell also includes two low voltage electrode layers, one low voltage electrode layer disposed over each of the two dielectric layers fabricated using non-aluminum containing materials. The cell also includes two discharge regions lacking aluminum containing materials, the first discharge region defined, in part, by the high voltage electrode layer, the dielectric layer disposed on the first side of the high voltage electrode layer, and the low voltage electrode layer disposed on the first side of the high voltage electrode layer, the second discharge region defined, in part, by the high voltage electrode layer, the dielectric layer disposed on the second side of the high voltage electrode layer, and the low voltage electrode layer disposed on the second side of the high voltage electrode layer. The cell also includes two thermally conductive plates, the first thermally conductive plate in contact with the low voltage electrode layer on the first side of the high voltage electrode layer, and the second thermally conductive plate in contact with the low voltage electrode layer on the second side of the high voltage electrode layer, wherein the two thermally conductive plates maintain contact between the layers located therebetween in the absence of a bonding agent to reduce the shear stresses in the ozone generator cell.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Figure 1:
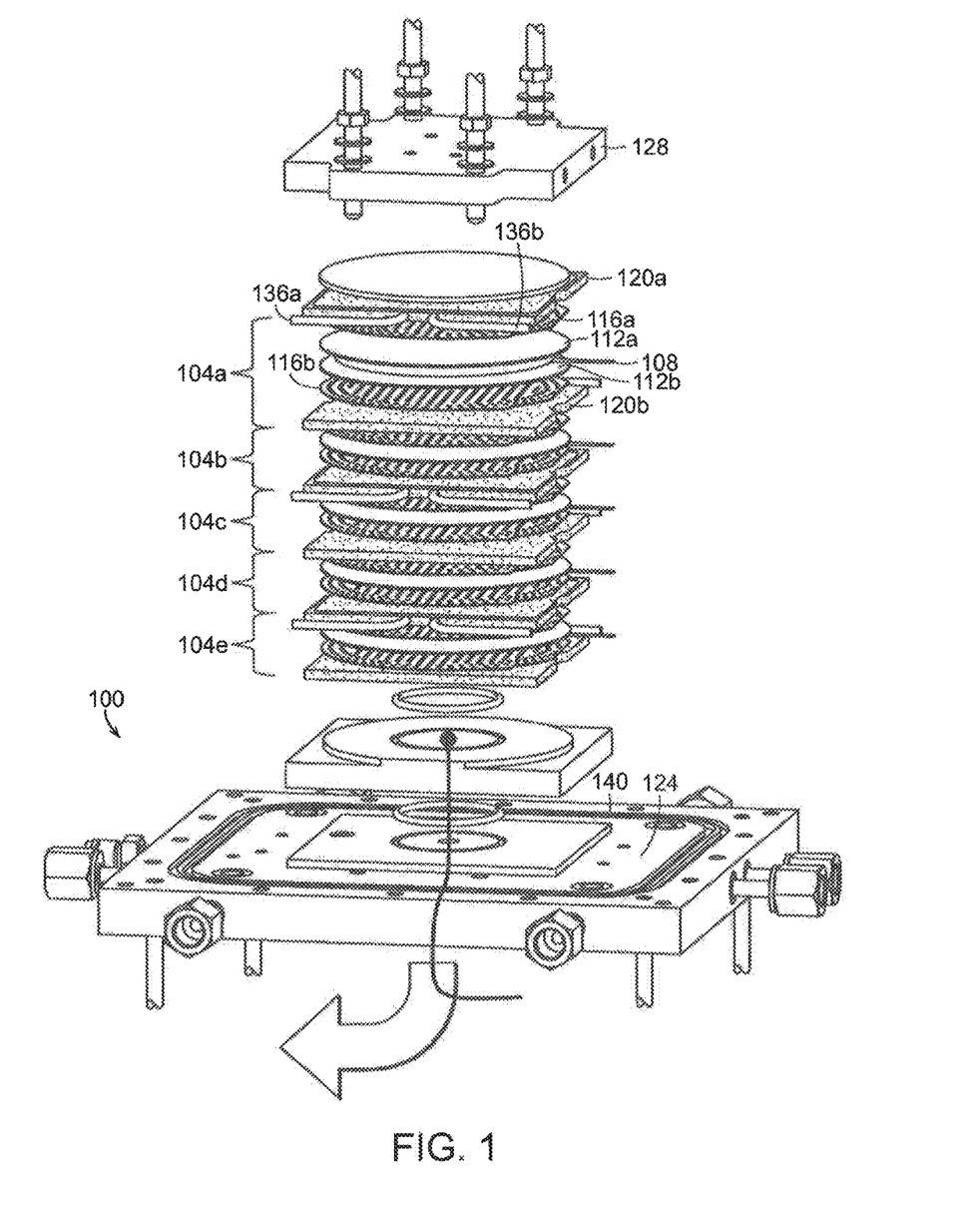
FIG. 1 is a schematic illustration of an ozone generator, according to an illustrative embodiment of the invention.

FIG. 1 is a schematic illustration of an ozone generator 100, according to an illustrative embodiment of the invention. The ozone generator 100 is configured to operate with the type of electrical discharge configuration commonly referred to as a dielectric barrier discharge (DBD) configuration. The configuration is typically described as including two current carrying planar or cylindrical, metal electrodes separated by at least one dielectric insulator. Application of high amplitude AC voltage between the metal electrodes results in a series of short-lived discharges (micro-discharges) in the region between the electrodes. If oxygen, or a mixture of oxygen and a dopant (e.g., nitrogen) is fed into the gap and through the discharge region, ozone is produced.

The ozone generator 100 includes five ozone generator cells 104a, 104b, 104c, 104d, and 104e (generally 104). Each ozone generator cell 104 includes a high voltage electrode layer 108 (e.g., a metal electrode (e.g., tungsten electrode)). Each of the cells 104 also includes two dielectric layers (112a and 112b, generally 112). The first dielectric layer 112a is disposed on a first side of the high voltage electrode layer 108 and the second dielectric layer 112b is disposed on the second, opposite side of the high voltage electrode layer 108.

The cells 104 also include two low voltage electrode layers (first low voltage electrode layer 116a and second low voltage electrode layer 116b, generally 116). One low voltage electrode layer 116 is disposed over/adjacent each of the two dielectric layers 112 (e.g., low voltage electrode layer 116a is disposed over dielectric layer 112a). In some embodiments, the low voltage electrode layers 116 are electrically grounded tungsten electrodes. The presence of aluminum in the discharge region (e.g., if the electrode layer were fabricated using aluminum) would reduce the efficiency of ozone generation and reduce the life of the ozone generator cells. Because the components in the discharge region (i.e., dielectric layers, the low voltage electrode layers, and the high voltage electrode layer) are fabricated using non-aluminum containing materials it is possible to create an ozone generator that produces high concentrations of ozone and that prevents long-term degradation of the system. In the absence of aluminum in the discharge region, it is no longer necessary to include a dopant (e.g., nitrogen) in the oxygen supplied to the ozone generator.

The ozone generator cells 104 also include two thermally conductive plates 120a and 120b (generally 120). The first thermally conductive plate 120a is in contact with the first low voltage electrode layer 116a on the first side of the high voltage electrode layer 108, and the second thermally conductive plate 120b is in contact with the second low voltage electrode layer 116b on the second side of the high voltage electrode layer 108. The two thermally conductive plates 120a and 120b are configured to apply a force to the components (e.g., high voltage electrode layers, dielectric layers, low voltage electrode layers) located between the plates to maintain contact between the layers located therebetween, in the absence of a bonding agent. Because a bonding agent is not used between the components, the shear stress between components is reduced; which reduces the sensitivity and fragility of the system to very low temperatures that are preferable for ozone generation. Further, the reduction in shear stress allows the ozone generators to be operated over a wide range of temperatures.

In this embodiment, the thermally conductive plates 120 have a fluid input 136a and a fluid output 136b. The fluid inputs 136a are configured to receive fluid from a coolant fluid source (not shown) into a cavity located within the plates 120. The fluid outputs 136b are configured to output fluid from the cavity. Heat applied to the thermally conductive plates 120 generated by the discharge process is transferred to the fluid in the cavity; the heat is then removed as the fluid is output from the fluid outputs 136b.

Each ozone generator cell 104 is bounded by two thermally conductive plates 120. An ozone generator cell 104 positioned adjacent to another ozone generator cell 104 share a common thermally conductive plate. For example, thermally conductive plate 120b is shared/used by ozone generator cell 104a and by ozone generator cell 104b to apply force to the components of the respective ozone generator cells and to cool the ozone generator cells.

The ozone generator 100 also includes a fixture base 124 and a spring loaded clamp plate 128. The spring loaded clamp place 128 is attached to the base plate 124 with a plurality of screws so the spring loaded clamp plate 128 applies force to the stack of ozone generator cells 104a, 104b, 104c, 104d, and 104e located therebetween. The ozone generator 100 also includes a cover (not shown for clarity of illustration purposes) that mates with the base plate 124 at a grooved surface 140 of the base plate 124. The cover creates a sealed chamber within which the ozone generator cells and plate 128 are located when the cover is mated to the base plate 124.

Figure 2A:
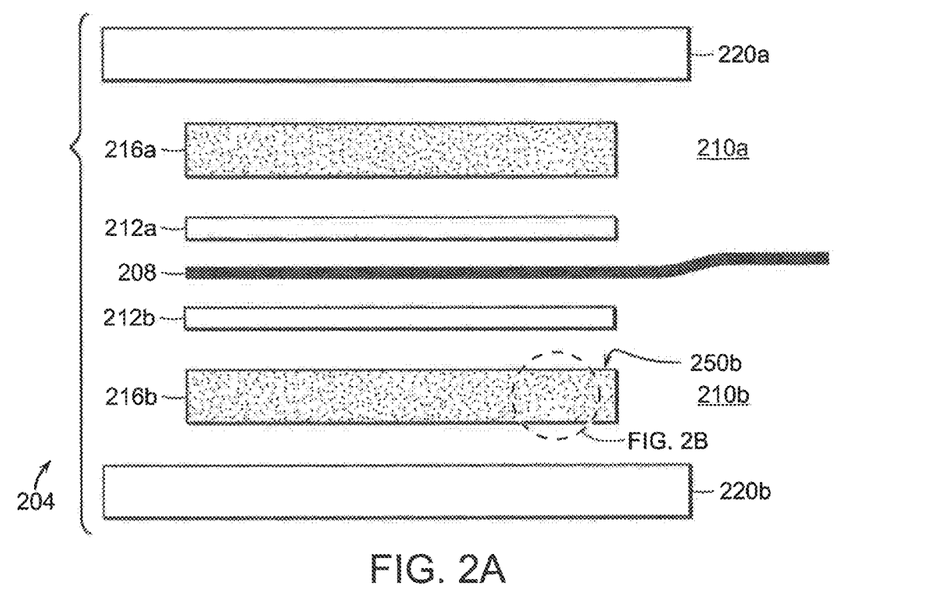
FIG. 2A is a schematic illustration of an exploded view of an ozone generator cell, according to an illustrative embodiment of the invention.

FIG. 2A is a schematic illustration of an exploded view of an ozone generator cell 204 (e.g., cells 104 of FIG. 1), according to an illustrative embodiment of the invention. The ozone generator cell 204 includes a high voltage electrode layer 208. The cell 204 also includes two dielectric layers 212a and 212b. The first dielectric layer 212a is disposed on a first side 210a of the high voltage electrode layer 208 and the second dielectric layer 212b is disposed on the second, opposite side 210b of the high voltage electrode layer 208.

Figure 2B:
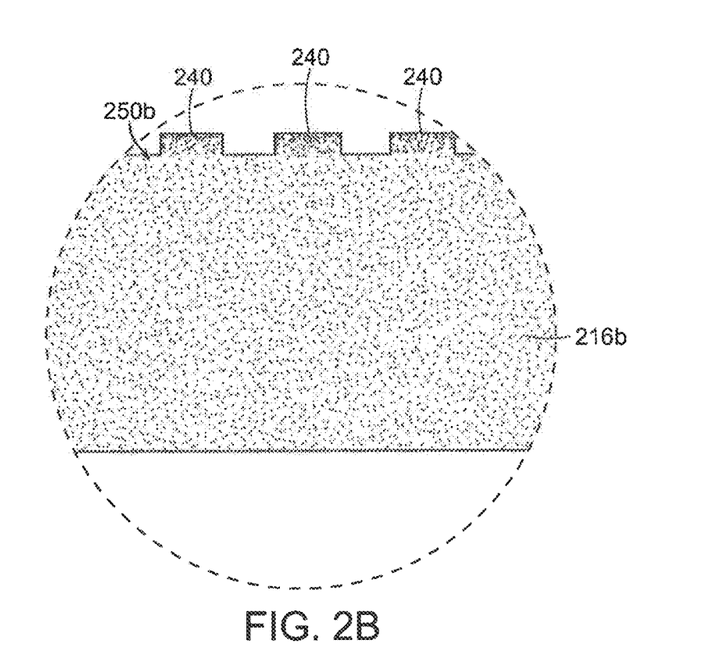
FIG. 2B is a more detailed view of a portion of the ozone generator cell of FIG. 2A, according to an illustrative embodiment of the invention.
Figure 2C:
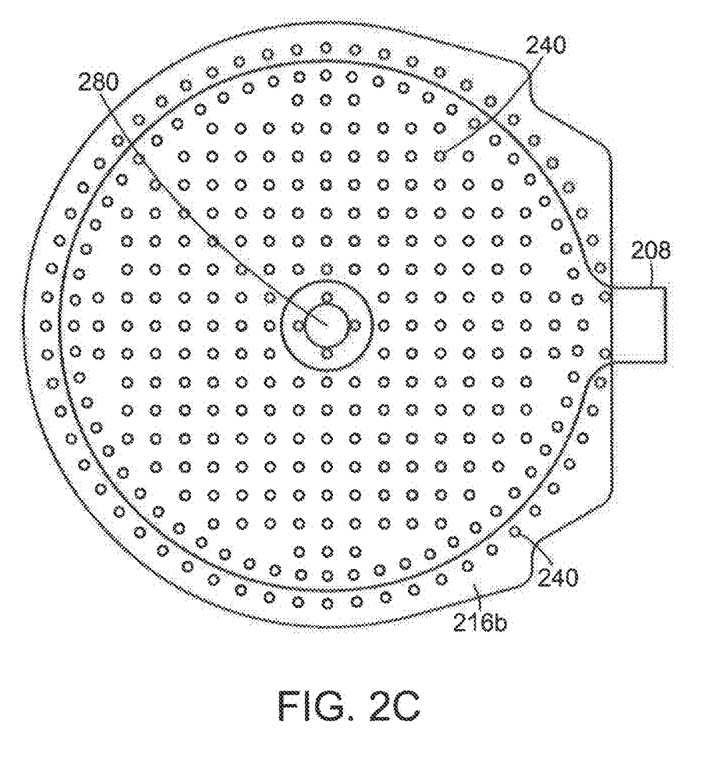
FIG. 2C is a schematic illustration of a surface of the low voltage electrode layer of FIG. 2A, according to an illustrative embodiment of the invention.

The cell 204 also includes a first low voltage electrode layer 216a and a second low voltage electrode layer 216b. Low voltage electrode layer 216a is disposed over the first dielectric layer 212a. Low voltage electrode layer 216b is disposed over the second dielectric layer 212b. FIG. 2B is a more detailed view of a portion of the ozone generator cell 204 of FIG. 2A. The second low voltage electrode layer 216b includes a plurality of spacer shims 240 located on the surface 250b of the second low voltage electrode layer 216b projecting towards the second dielectric layer 212b and the high voltage electrode layer 208 (with reference to FIG. 2A). FIG. 2C is a schematic illustration of the surface 250b of the low voltage electrode layer 216b of FIGS. 2A and 2B. The spacer shims 240 are distributed across the surface 250b of the low voltage electrode layer 216b.

The low voltage electrode layers 216, the high voltage electrode layers 208, the dielectric layers 212, the thermally conductive plates 220 have coaxially aligned apertures 280. Gas supplied to the ozone generator cells flows into the outer edges of the ozone generator cells towards the center of the ozone generator cells. As the gas flows towards the center of the ozone generator cells electrical discharges are created within the ozone generator cells (as described with respect to, for example, FIG. 2E). The electrical discharges create ozone which then flows through central aperture 280 and to a gas output of the ozone generator.

The spacer shims 240 can be produced using a variety of methods. In some embodiments, the spacer shims 240 are created by etching the surface 250b of the second low voltage electrode around the desired locations of the spacer shims such that the spacer shims protrude from the surface 250b. In some embodiments, material for the spacer shims 240 is screened on to the surface 250b and then fired to create the spacer shims 240. In some embodiments, the spacer shims 240 are formed by creating dimples in the surface 250b of the second low voltage electrode 216b (e.g., by using a punch or other mechanical method to cause the material of the second low voltage electrode layer to dimple). Other methods can be used in alternative embodiments (e.g., plating, vacuum evaporation, sputtering). In some embodiments, the spacer shims 240 are a separate piece of material (or materials) held in place by friction and located between the surface 250*b* of the low voltage electrode layer 216*b* and the second dielectric layer 212*b*.

While not shown, the first low voltage electrode layer 216*a* also includes a plurality of spacer shims located on the surface of the first low voltage electrode layer 216*a* projecting towards the first dielectric layer 212*a* and the high voltage electrode layer 208 (with reference to FIG. 2A).

The ozone generator cell 204 also includes two thermally conductive plates 220*a* and 220*b* (with reference to FIG. 2A). The first thermally conductive plate 220*a* is located over the first low voltage electrode layer 216*a* on the first side 210*a* of the high voltage electrode layer 208, and the second thermally conductive plate 220*b* is located over the second low voltage electrode layer 216*b* on the second side 210*b* of the high voltage electrode layer 208. The two thermally conductive plates 220*a* and 220*b* are configured to apply a force to the components located between the plates to maintain contact between the layers located therebetween in the absence of a bonding agent.

Figure 2D:
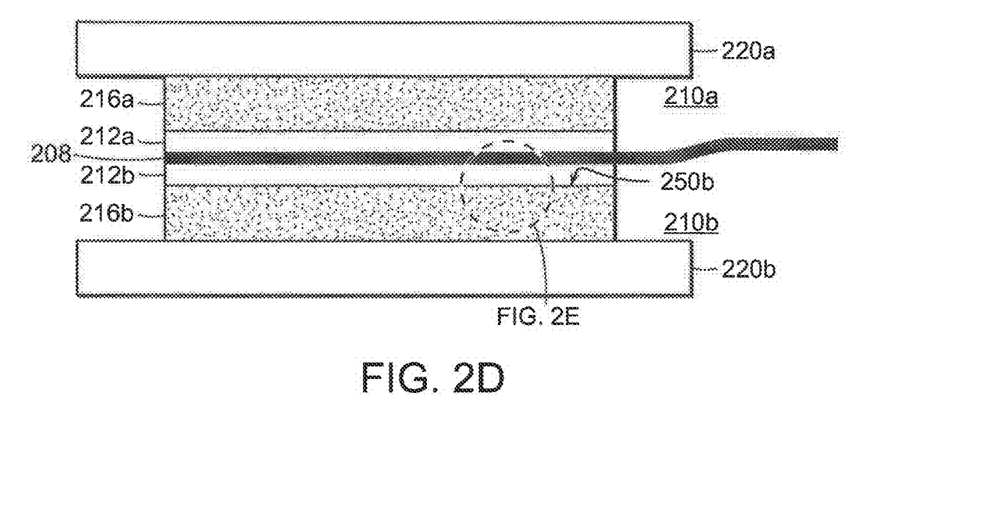
FIG. 2D is a schematic illustration of an assembled view of the ozone generator cell of FIG. 2A, according to an illustrative embodiment of the invention.
Figure 2E:
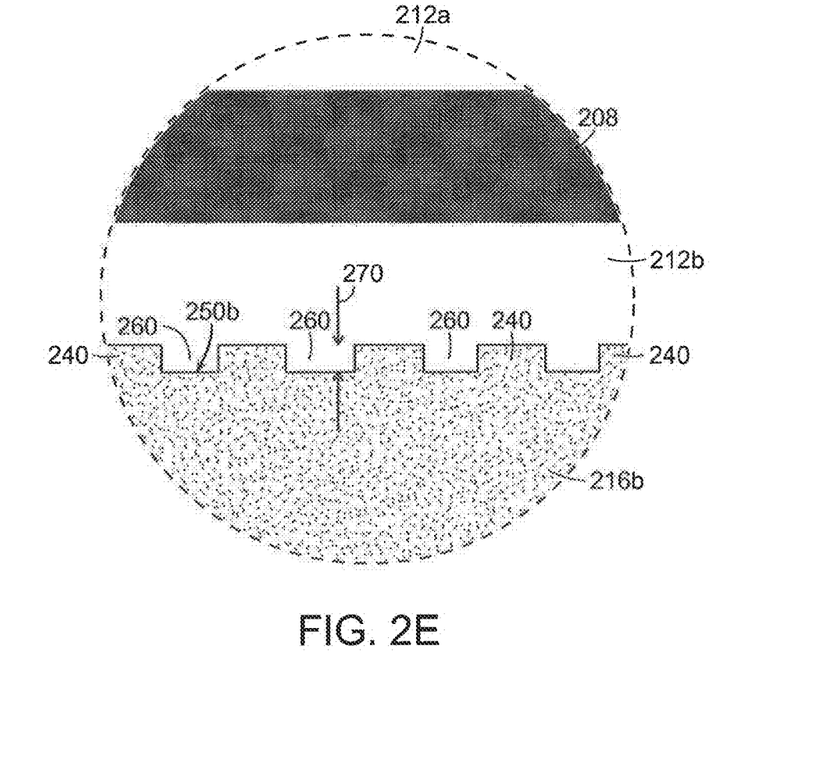
FIG. 2E is a more detailed view of a portion of the ozone generator cell of FIG. 2D, according to an illustrative embodiment of the invention.

FIG. 2D is a schematic illustration of an exploded view of the ozone generator cell 204 of FIG. 2A after the components of the ozone generator have been sandwiched together between the first and second thermally conductive plates 220*a* and 220*b*. FIG. 2E is a more detailed view of a portion of the ozone generator cell 204 of FIG. 2D. Gaps 260 are defined by the combination of the second dielectric layer 212*b*, low voltage electrode layer 216*b* and the spacer shims 240. A high voltage lead wire (not shown) energizes the high voltage electrode layer 208 relative to the low voltage electrode layer 216*b* at a voltage level sufficient to cause an electrical discharge in the region of the gaps 260. The electrical discharges produce ozone if oxygen is introduced into the gaps 260 of the ozone generator cell 204.

Experiments conducted by the inventors demonstrate the primary source of ozone in a no-dopant ozone generator with the proper metal electrode is of photocatalytic origin. In some embodiments, tungsten oxide is used because of the material's photocatalytic properties. Tungsten oxide becomes slightly oxygen deficient in use and the resulting oxide is an n-type semiconductor. Molecular oxygen is electro-negative and, when it attracts an electron, forms $O_2^-$. This produces a layer of $O_2^-$ on the surface of the n-type tungsten oxide. An electron-hole pair is formed when the tungsten oxide absorbs a photon ($\gamma$). The hole, which is $O^+$, migrates to the surface and combines with the $O_2^-$ to form ozone. The lattice oxygen from the tungsten oxide consumed in this reaction is replenished by contact of the oxide with the discharges and the diffusion of oxygen through the tungsten oxide. Electrons in the discharge create photons by free-free and free-bound collisions with the oxygen species in the discharge. The electrons also destroy ozone, and excite and de-excite molecular oxygen. The photons create ozone on the photocatalyst surface (e.g., tungsten oxide surface of the low voltage electrode layer 216*b*) and destroy ozone in the gas phase. The gas phase reactions combine the oxygen species present in the gas and produce ozone and molecular oxygen.

One of the insights gained was the realization that the gas phase reactions create ozone from the atomic oxygen resulting from the destruction of the source ozone generated on the photocatalyst. The gas phase reactions are temperature dependent with the reaction rates decreasing as gas temperature increases. The decrease in ozone generation with increasing gas temperature observed in typical generators of this type is due to the decreased gas phase reaction rates and not due to thermal destruction of the ozone. Photons emitted by the discharge are absorbed by the ozone in the discharge space in the gaps 260. The absorption has two effects: it destroys ozone and reduces the flux of ozone-creating photons to the photocatalytic surface. These effects can be minimized by making the path length of the photons through the ozone containing gas as short as possible by making the gap 270 (distance between second low voltage electrode layer 216*b* and the second dielectric layer 212*b*) smaller. The added benefit of making the gap 270 smaller is the capacitance of the combination of the high voltage electrode layer 208 and the dielectric layers 212 increases. The increased capacitance reduces the magnitude of the voltage to be supplied to the high voltage electrode layer to produce ozone.

Figure 3:
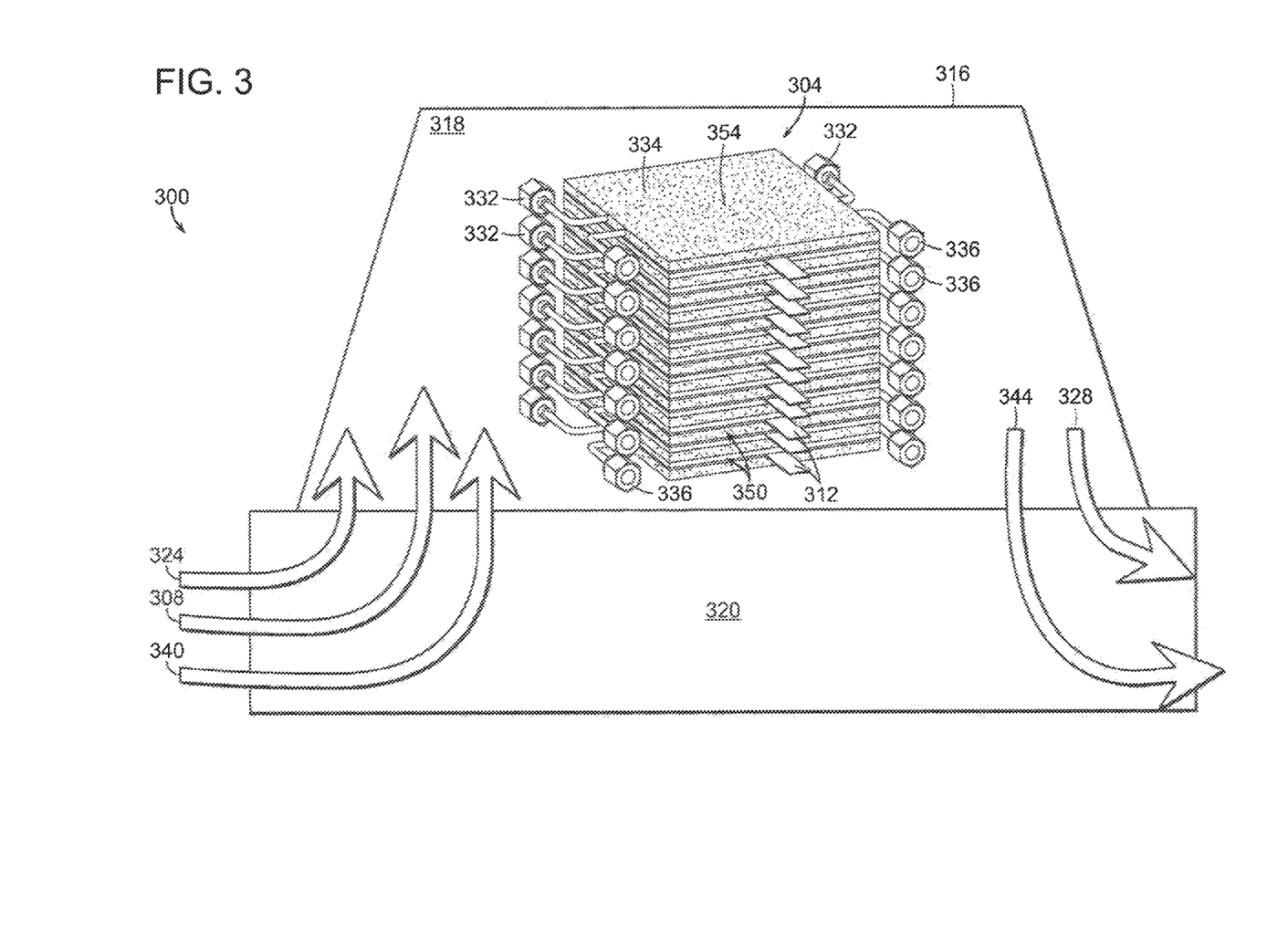
FIG. 3 is a schematic illustration of an ozone generator, according to an illustrative embodiment of the invention.

FIG. 3 is a schematic illustration of an ozone generator 300, according to an illustrative embodiment of the invention. The ozone generator 300 includes a plurality of stacked ozone generator cells 304 (e.g., cells 104 of FIG. 1). The ozone generator cells 304 are located in a sealed chamber 318 defined by a cover 316 that is attached (e.g., welded) to a base plate 320 (base plate 124 of FIG. 1). The ozone generator 300 includes a high voltage supply 308 that provides a high voltage signal to the high voltage electrode layers 312 of the ozone generator cells 304 (e.g., high voltage layers 108 of the ozone generator cells 104 of FIG. 1).

The ozone generator 300 also includes a coolant fluid source 324 and a coolant exhaust 328. The coolant supply 324 provides coolant to fluid inputs 332 of thermally conductive plates 334 of the ozone generator cells 304. The coolant flows through cavities within the conductive plates 334 and outputs the coolant via fluid outputs 336 of the ozone generator cells 304 to the coolant exhaust 328.

The ozone generator cell 300 also includes a gas supply 340 (e.g., oxygen supply) that supplies a flow of gas to sealed chamber 318. The gas flows into the edges 350 of the ozone generator cells 304 towards the center 354 of the ozone generator cells. As the gas flows towards the center 354 of the ozone generator cells 304 electrical discharges are created within the ozone generator cells 304 (as described above with respect to, for example, FIG. 2E). The electrical discharges create ozone which then flows through an aperture (e.g., central aperture 280 of FIG. 2C) in the ozone generator cells 304 to a gas output 344.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. An ozone generator comprising:
   an ozone generator cell comprising:
   a high voltage electrode layer,
   a first dielectric layer and a second dielectric layer, the high-voltage electrode being disposed between the first dielectric layer and the second dielectric layer,
   a first low voltage electrode layer and a second low voltage electrode layer, the high-voltage electrode, the first dielectric layer and the second dielectric layer being disposed between the first low voltage electrode layer and the second low voltage electrode layer,
a first discharge region and a second discharge region, the high voltage electrode layer being disposed between the first discharge region and the second discharge region, and
a first thermally conductive plate and a second thermally conductive plate, the high-voltage electrode, the first dielectric layer, the second dielectric layer, the first low voltage electrode layer, the second low voltage electrode layer, the first discharge region, and the second discharge region being disposed between the first thermally conductive plate and the second thermally conductive plate;
a base plate over which the ozone generator cell is positioned; and
a spring-loaded clamp plate coupled to the base plate such that the ozone generator cell is disposed between the base plate and the spring-loaded clamp plate, such that the coupled base plate and spring-loaded clamp plate apply pressure to the ozone generator cell to hold the high-voltage electrode, the first dielectric layer, the second dielectric layer, the first low voltage electrode layer, and the second low voltage electrode layer of the ozone generator cell together.

2. The ozone generator of claim 1, wherein the coupled base plate and spring-loaded clamp plate apply pressure to the ozone generator cell to hold the high-voltage electrode, the first dielectric layer, the second dielectric layer, the first low voltage electrode layer and the second low voltage electrode layer of the ozone generator cell together in the absence of a bonding agent.

3. The ozone generator of claim 2, wherein the absence of the bonding agent results in the ozone generator cell having reduced thickness.

4. The ozone generator of claim 3, wherein the reduced thickness produces an increased capacitance between the low voltage electrode layers and the high voltage electrode layer.

5. The ozone generator of claim 1, wherein the two dielectric layers, the two low voltage electrode layers, and the high voltage electrode layer are all fabricated using non-aluminum containing materials.

6. A method of fabricating an ozone generator, comprising:
fabricating an ozone generator cell, comprising:
locating a high voltage electrode layer between a first dielectric layer and a second dielectric layer,
locating the high voltage electrode layer, the first dielectric layer and the second dielectric layer between a first low voltage electrode layer and a second low voltage electrode layer,
locating the high voltage electrode layer between a first discharge region and a second discharge region, and
locating the high-voltage electrode, the first dielectric layer, the second dielectric layer, the first low voltage electrode layer, the second low voltage electrode layer, the first discharge region, and the second discharge region between a first thermally conductive plate and a second thermally conductive plate;
locating the ozone generator cell over a base plate; and
coupling a spring-loaded clamp plate to the base plate such that the ozone generator cell is disposed between the base plate and the spring-loaded clamp plate, such that the coupled base plate and spring-loaded clamp plate apply pressure to the ozone generator cell to hold the high-voltage electrode, the first dielectric layer, the second dielectric layer, the first low voltage electrode layer, and the second low voltage electrode layer of the ozone generator cell together.

7. The method of claim 6, wherein the coupled base plate and spring-loaded clamp plate apply pressure to the ozone generator cell to hold the high-voltage electrode, the first dielectric layer, the second dielectric layer, the first low voltage electrode layer and the second low voltage electrode layer of the ozone generator cell together in the absence of a bonding agent.

8. The method of claim 7, wherein the absence of the bonding agent results in the ozone generator cell having reduced thickness.

9. The method of claim 8, wherein the reduced thickness produces an increased capacitance between the low voltage electrode layers and the high voltage electrode layer.

10. The method of claim 6, wherein the two dielectric layers, the two low voltage electrode layers, and the high voltage electrode layer are all fabricated using non-aluminum containing materials.

* * * * *